(12) United States Patent
Humfeld et al.

(10) Patent No.: US 10,670,565 B2
(45) Date of Patent: Jun. 2, 2020

(54) ULTRASOUND INSPECTION SYSTEM

(71) Applicant: The Boeing Company, Chicago, IL (US)

(72) Inventors: Keith Daniel Humfeld, Federal Way, WA (US); Scott D. Hartshorn, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 397 days.

(21) Appl. No.: 15/485,757

(22) Filed: Apr. 12, 2017

(65) Prior Publication Data
US 2018/0299411 A1 Oct. 18, 2018

(51) Int. Cl.
| | | |
|---|---|---|
| G01N 29/04 | (2006.01) |
| G01N 29/07 | (2006.01) |
| G01N 29/11 | (2006.01) |
| G01N 29/34 | (2006.01) |

(52) U.S. Cl.
CPC .......... *G01N 29/043* (2013.01); *G01N 29/07* (2013.01); *G01N 29/11* (2013.01); *G01N 29/343* (2013.01); *G01N 29/348* (2013.01); *G01N 2291/011* (2013.01); *G01N 2291/015* (2013.01); *G01N 2291/044* (2013.01); *G01N 2291/106* (2013.01)

(58) Field of Classification Search
CPC ...... G01N 29/043; G01N 29/07; G01N 29/11; G01N 29/343; G01N 29/348; G01N 2291/011; G01N 2291/015; G01N 2291/044; G01N 2291/106
See application file for complete search history.

(56) References Cited

U.S. PATENT DOCUMENTS

| | | | |
|---|---|---|---|
| 5,632,277 A | 5/1997 | Chapman et al. | |
| 8,000,926 B2 | 8/2011 | Roche et al. | |
| 8,270,253 B1 | 9/2012 | Roche et al. | |
| 2011/0218743 A1* | 9/2011 | Smith | G01N 29/11 702/56 |
| 2013/0197824 A1* | 8/2013 | Baba | G01N 29/07 702/39 |
| 2017/0219536 A1* | 8/2017 | Koch | G01N 29/0645 |
| 2017/0219704 A1* | 8/2017 | Call | A61B 8/483 |

FOREIGN PATENT DOCUMENTS

WO WO2016106154 A1 6/2016

* cited by examiner

*Primary Examiner* — David Z Huang
(74) *Attorney, Agent, or Firm* — Yee & Associates, P.C.

(57) ABSTRACT

A method and system for inspecting a structure. The method may comprise sending a pulsed wave signal into the structure from a transmitter array. The method may detect a response signal in response to sending the pulsed wave signal into the structure at a group of receivers in a receiver array. The method may identify a group of time delays between sending the pulsed wave signal and may detect the response signal generated in response to the pulsed wave signal at the group of receivers. The method may identify a group of intensities for the response signal detected at the group of receivers. The method may determine a distance to a reflector within the structure using the group of time delays and the group of intensities.

20 Claims, 12 Drawing Sheets

ULTRASOUND INSPECTION SYSTEM

BACKGROUND INFORMATION

1. Field

The present disclosure relates generally to inspecting structures, and in particular, to a method and apparatus for inspecting composite structures using an ultrasound inspection system.

2. Background

In pulse-echo ultrasound imaging, a transducer may send a pulse of high frequency sound into a structure. The echoes of that sound bounce off of any boundaries in the structure and may be picked up as a series of time-delayed returns that are detected by a microphone. Regions of the structure with different modulus will respond to sound differently, causing a reflection of the traveling sound wave. The modulus may change in regions having, for example, voids, resin, or some combination thereof. This information may be used to map the structure.

Often times, however, the information returned from the echoes may not be as useful as desired to identify inconsistencies, such as voids or delaminations in a composite structure. Additionally, the information returned from echoes may not be sufficient to detect other types of reflectors, such as a ply boundary in a composite structure. As a result, additional repositioning of the transducer and testing of the structure may be performed. These additional operations may increase the time, expense, or both, needed to inspect structures in a manner that is greater than desired.

Therefore, it would be desirable to have a method and apparatus that take into account at least some of the issues discussed above, as well as other possible issues. For example, it would be desirable to have a method and apparatus that overcome a technical problem with at least one of detecting and locating the positions of reflectors in structures using ultrasound systems.

SUMMARY

An embodiment of the present disclosure provides a method for inspecting a structure. The method may comprise sending a pulsed wave signal into the structure from a transmitter array. The method may detect a response signal in response to sending the pulsed wave signal into the structure at a group of receivers in a receiver array. The method may identify a group of time delays between sending the pulsed wave signal and detecting the response signal generated in response to the pulsed wave signal at the group of receivers. The method may identify a group of intensities for the response signal detected at the group of receivers. The method may determine a distance to a reflector within the structure using the group of time delays and the group of intensities.

Another embodiment of the present disclosure may provide an ultrasound inspection system. The ultrasound inspection system may comprise a transmitter array, a receiver array, and an inspection controller. The transmitter array may be configured to transmit pulsed wave signals and the receiver array may be configured to detect response signals. The inspection controller maybe configured to cause the transmitter array to send a pulsed wave signal into a structure from the transmitter array. The inspection controller may detect a response signal in response to sending the pulsed wave signal into the structure at a group of receivers in the receiver array. The inspection controller may identify a group of time delays from sending the pulsed wave signal and detecting the response signal generated in response to the pulsed wave signal at the group of receivers. The inspection controller may identify a group of intensities for the response signal at the group of receivers. The inspection controller may determine a distance to a reflector within the structure using the group of time delays and the group of intensities.

Yet another embodiment of the present disclosure provides a method for inspecting a structure. The method identifies a group of expected intensities at each of the group of receivers for a response signal based on the distance to each reflector in the group of reflectors in a structure and the response signal at one receiver in the group of receivers. The response signal is received in response to a pulsed wave signal sent into the structure.

A further embodiment of the present disclosure provides a method for inspecting a composite structure. The method may differentiate between ply boundaries and porosity in the composite structure using a group of intensities in a response signal.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
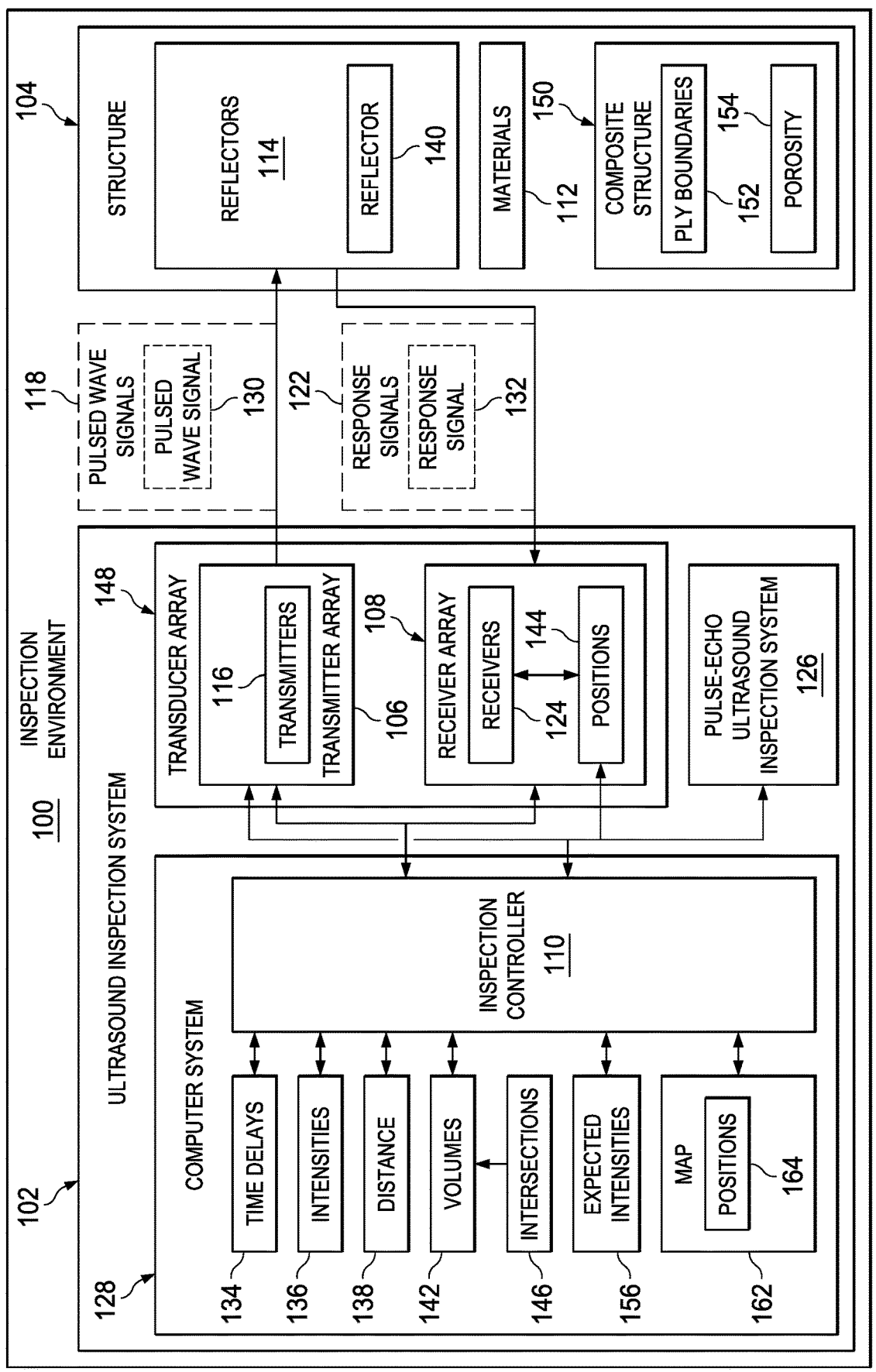
FIG. 1 is an illustration of a block diagram of an inspection environment in accordance with an illustrative embodiment.

The illustrative embodiments recognize and take into account one or more different considerations. For example, the illustrative embodiments recognize and take into account that the sensitivity of ultrasound systems may not be as great as desired to detect features of structures, such as composite structures. The illustrative embodiments also recognize and take into account that it may be desirable to increase the sensitivity of a pulse echo ultrasound system such that the resolution of the information may be used to detect features, such as pores and voids in a composite structure. The illustrative embodiments also recognize and take into account that it may be desirable to increase the sensitivity of a pulse echo ultrasound system for other applications, such as testing organic structures for medical uses, ships, cars, rockets, buildings, pipes, or other structures.

The illustrative embodiments recognize and take into account that currently the identification of locations of a ply boundary may be accomplished only through destructive imaging, and not with pulse echo ultrasound. With destructive imaging, a structure may be cut into pieces, the faces of the pieces may be polished, then those pieces may be examined under a microscope or other type of imaging system. The illustrative embodiments also recognize and take into account that it may be desirable to have a level of sensitivity in an ultrasound system using pulse echo ultrasound that enables mapping of ply boundaries in a composite structure.

The illustrative embodiments recognize and take into account when an array of receivers is used, the distance from an individual reflector to each of the receivers may be different. In one illustrative example, the receiver array may be an array of microphones. This situation may allow precise triangulation of the response signal from the reflector and can be uniquely distinguished in the response signal picked up by each microphone. The illustrative embodiments also recognize and take into account that pulse signals, such as pressure waves, lose intensity as they travel through a medium. As a result, the two factors of time delay and measured sound intensity are actually both functions of the same variable of distance from the transmitter to the reflector to the microphone.

Thus, the illustrative embodiments provide a method and apparatus for inspecting the structure. In one illustrative example, an ultrasound inspection system may comprise a transmitter array, a receiver array, and an inspection controller. The transmitter array may be configured to transmit pulsed wave signals. The receiver array may be configured to detect response signals. The inspection controller may be configured to cause the transmitter array to send a pulsed wave signal into the structure from a transmitter array and detect a response signal in response to sending the pulsed wave signal into the structure at a group of receivers in the receiver array. The inspection controller also may be configured to identify a group of time delays from sending the pulsed wave signal and to detect the response signal generated in response to the pulsed wave signal at the group of receivers and identify a group of intensities for the response signal detected at the group of receivers. The inspection controller also may be configured to determine a distance to a reflector within the structure using the group of time delays and the group of intensities.

With reference now to the figures, and in particular with reference to FIG. 1, an illustration of a block diagram of an inspection environment is depicted in accordance with an illustrative embodiment. As depicted, inspection environment 100 includes ultrasound inspection system 102.

In this illustrative example, ultrasound inspection system 102 may be used to inspect structure 104. Structure 104 may take a number of different forms. For example, structure 104 may be comprised of at least one of a composite structure, an organic structure, an aircraft, a dam, a bridge, a road, a skin panel, a building, a rib, a spar, a stringer, an engine housing, a fuselage section, a monument, a container, a wall, a pipe, a control surface, a fuel tank, a body, an arm, a leg, a torso, or some other suitable structure for which an inspection is desired.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

Structure 104 may be comprised of a group of materials 112. The group of materials 112 may be selected from at least one of a composite material, a metal, an alloy, an organic material, a plastic, or some other suitable type of material that may be used in structure 104.

In this illustrative example, ultrasound inspection system 102 may be comprised of transmitter array 106, receiver array 108, and inspection controller 110. As depicted, transmitter array 106 is comprised of a group of transmitters 116 and may be configured to transmit pulsed wave signals 118. Receiver array 108 may be configured to detect response signals 122. Receiver array 108 may be comprised of a group of receivers 124. Response signals 122 may be generated in response to pulsed wave signals 118 encountering a group of reflectors 114 within structure 104.

In this illustrative example, ultrasound inspection system 102 with inspection controller 110, using transmitter array 106 and receiver array 108, may form pulse-echo ultrasound inspection system 126. Also, transmitter array 106 and receiver array 108 may be located in transducer array 148.

As depicted, inspection controller 110 may be a component located in computer system 128. Computer system 128 may be a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, an electronic flight bag, a mobile phone, or some other suitable type of data processing system.

As depicted, inspection controller 110 may be configured to cause transmitter array 106 to send pulsed wave signal 130 in pulsed wave signals 118 into structure 104 from transmitter array 106 and detect response signal 132 in response signals 122. In this example, response signal 132 may be generated as a reflection that is in response to sending pulsed wave signal 130 into structure 104. As depicted, response signal 132 may be detected at a group of receivers 124 in receiver array 108.

In this illustrative example, inspection controller 110 also may be configured to identify a group of time delays 134 from sending pulsed wave signal 130 and detecting response signal 132 generated in response to pulsed wave signal 130 at the group of receivers 124 and identify a group of intensities 136 for response signal 132 detected at the group of receivers 124. Inspection controller 110 also may be configured to determine distance 138 to reflector 140 in reflectors 114 within structure 104 using the group of time delays 134 and the group of intensities 136.

Inspection controller 110 may determine a group of volumes 142 in a space containing a group of reflectors 114 using the group of time delays 134 and a group of positions 144 of the group of receivers 124. Inspection controller 110 also may determine a group of intersections 146 of the group of volumes 142. The group of intersections 146 may be positions 164 of reflector 140. Positions 164 may be in three dimensions and described using a Cartesian coordinate system and may be potential positions for reflector 140.

Inspection controller 110 also may determine a group of expected intensities 156 at each of the group of receivers 124 for response signal 132 based on distance 138 to reflectors 114 and response signal 132 of one or more of receivers 124.

In the illustrative example, structure 104 may be composite structure 150. With this example, inspection controller 110 differentiates between ply boundaries 152 and porosity 154 in structure 104 using the group of intensities 136 in response signal 132.

In one illustrative example, wherein the inspection controller 110 may create map 162 of structure 104. Map 162 includes positions 164 of reflector 140 within structure 104 using the group of time delays 134 and the group of intensities 136.

Inspection controller 110 may be implemented in software, hardware, firmware or a combination thereof. When software is used, the operations performed by Inspection controller 110 may be implemented in program code configured to run on hardware, such as a processor unit. When firmware is used, the operations performed by inspection controller 110 may be implemented in program code and data, and stored in persistent memory to run on a processor unit. When hardware is employed, the hardware may include circuits that operate to perform the operations in inspection controller 110.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, one or more technical solutions may be present that overcome a technical problem with at least one of detecting and locating the positions of reflectors in structures using ultrasound systems. As a result, one or more technical solutions may provide a technical effect in which inspection controller 110 uses the group of time delays 134 and the group of intensities 136 to increase a signal-to-noise ratio (SNR) for response signal 132. With the increase in the signal-to-noise ratio, increased efficiency, and increased detecting and locating of reflectors 114 may occur using ultrasound inspection system 102. For example, using the group of time delays 134 and the group of intensities 136 increases a signal to noise ratio for response signal 132.

As a result, computer system 128 operates as a special purpose computer system in which inspection controller 110 in computer system 128 enables increasing the amount of data that can be analyzed in response signals 132. In particular, inspection controller 110 transforms computer system 128 into a special purpose computer system, as compared to currently available general computer systems that do not have inspection controller 110.

Figure 2:
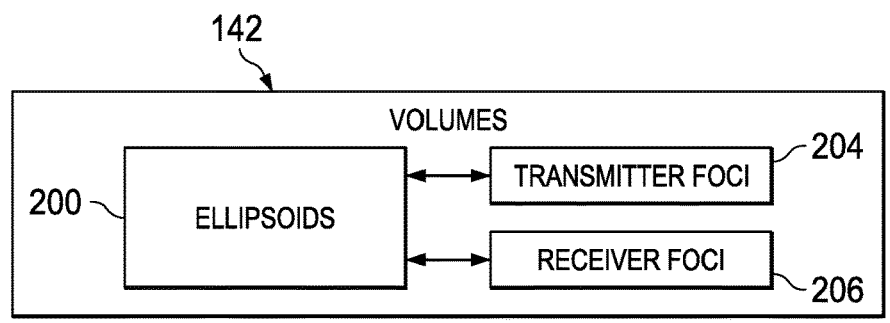
FIG. 2 is an illustration of a block diagram of volumes in accordance with an illustrative embodiment.

Reference now to FIG. 2, an illustration of a block diagram of volumes is depicted in accordance with an illustrative embodiment. In this illustrative example, volumes 142 may take the form of ellipsoids 200. As depicted, each of ellipsoids 200 has two foci, transmitter foci 204 and receiver foci 206. In this depicted example, transmitter foci 204 is the same for all of ellipsoids 200, while changing for each of the group of receivers 124.

The illustration of inspection environment 100 and the different components in this environment in FIGS. 1 and 2 are not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

In one illustrative example, a group of expected intensities at each of the group of receivers 124 for response signal 132 is determined based on distance 138 to each reflector in the group of reflectors 114 and response signal 132 at one receiver in the group of receivers 124.

Figure 3:
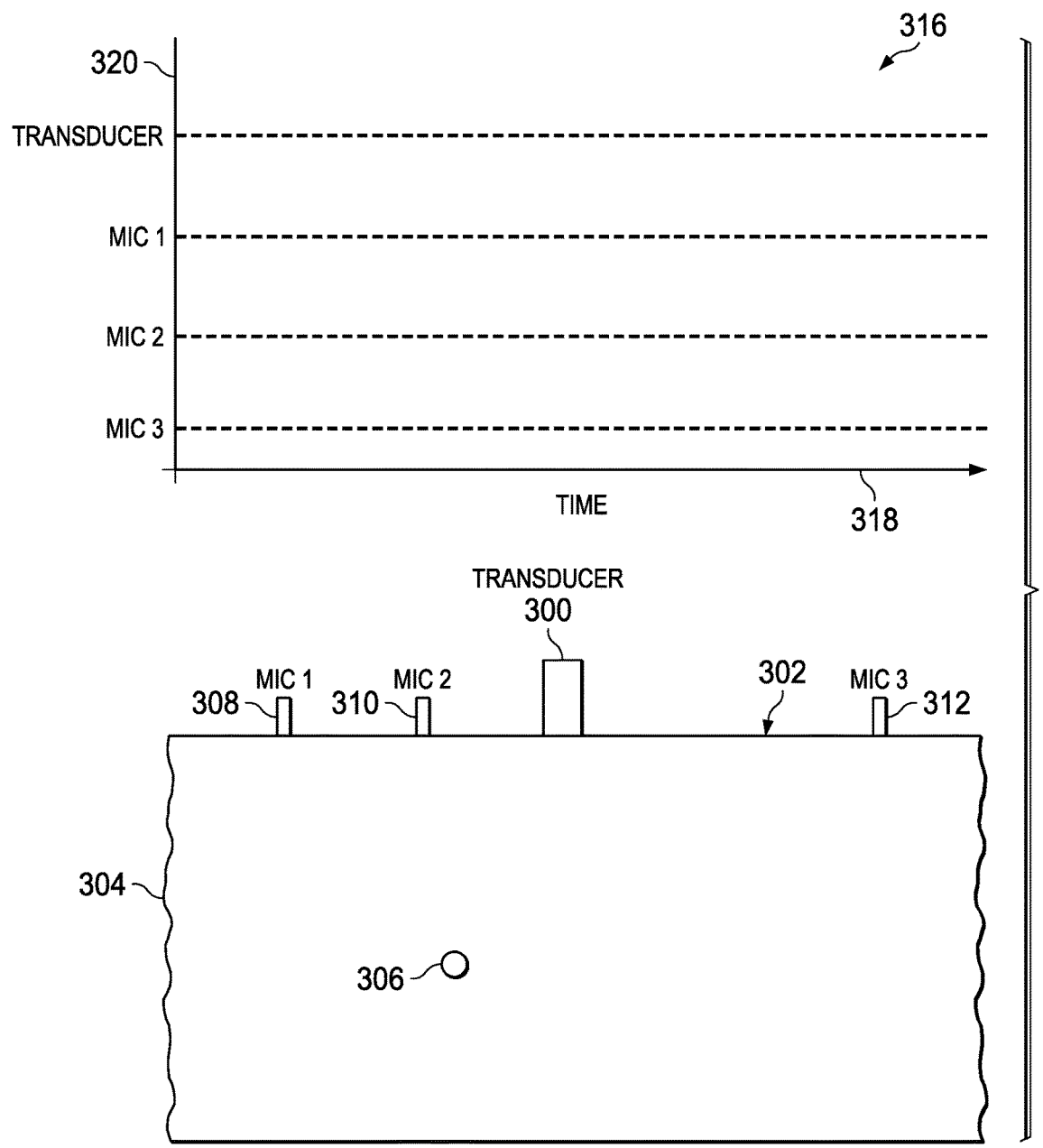
FIG. 3 is an illustration of a transducer and receivers prior to transmission of a pulsed wave signal in accordance with an illustrative embodiment.

With reference now to FIGS. 3-9, illustrations of the propagation of a pulsed wave signal and a response signal are depicted in accordance with an illustrative embodiment. In FIG. 3, an illustration of a transducer and receivers prior to transmission of a pulsed wave signal is depicted in accordance with an illustrative embodiment. In this illustrative example, transducer 300 may be positioned on surface 302 of composite structure 304 containing reflector 306. Additionally, receiver 308, receiver 310, and receiver 312 may be microphones positioned on surface 302 of composite structure 304.

Graph 316 has time on x-axis 318 and intensity on y-axis 320. Signals are absent on graph 316 in this figure because transducer 300 has not generated a pulsed wave signal.

Figure 4:
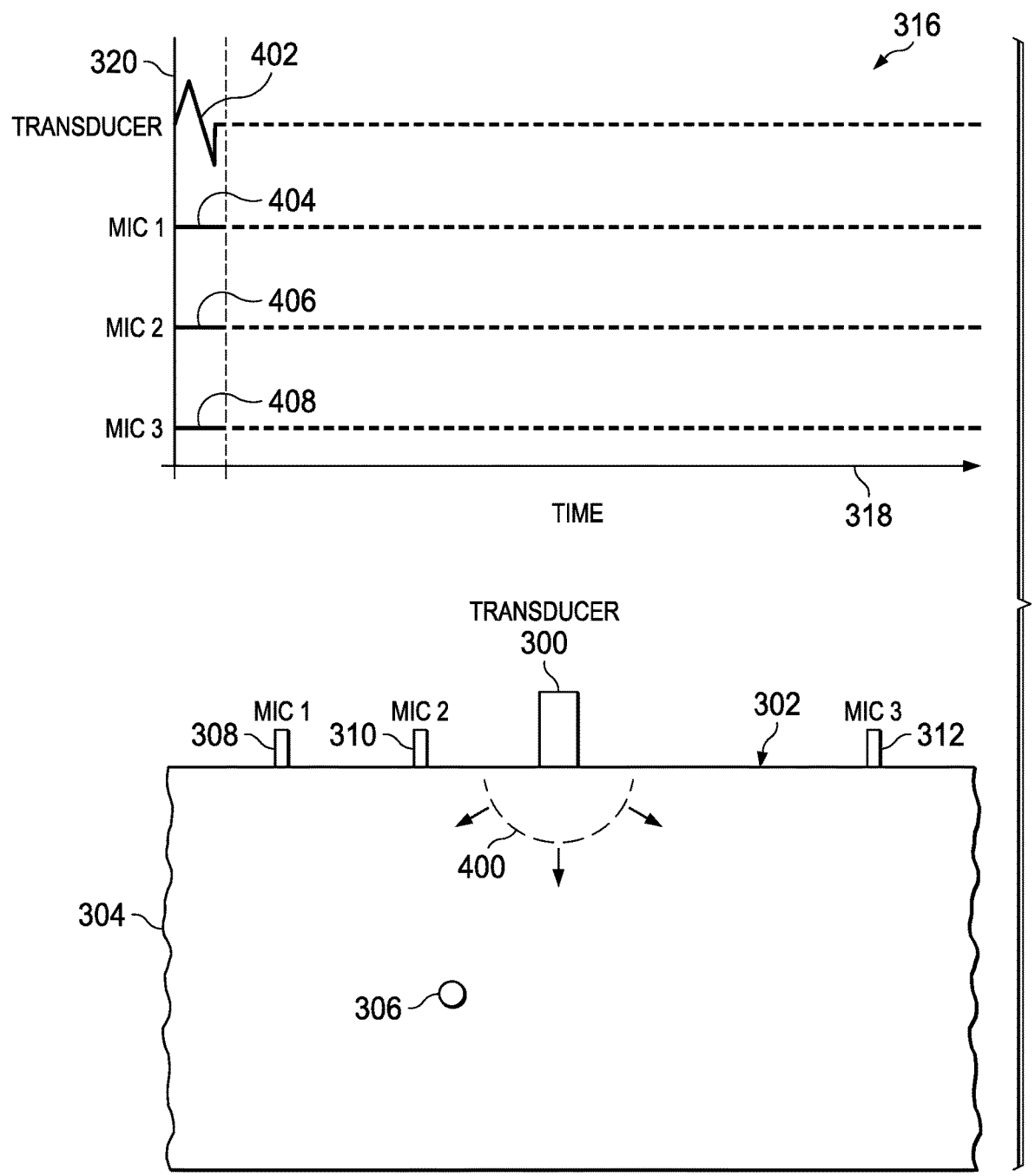
FIG. 4 is an illustration of a transducer sending a pulsed wave signal in accordance with an illustrative embodiment.

Turning next to FIG. 4, an illustration of a transducer sending a pulsed wave signal is depicted in accordance with an illustrative embodiment. In this figure, transducer 300 has sent pulsed wave signal 400 into composite structure 304.

Graph 316 shows signal 402 for transducer 300, signal 404 for receiver 308, signal 406 for receiver 310, and signal 408 for receiver 312. In some illustrative examples, transducer 300 may be in the same structure or array as the receivers. Further, transducer 300 also may operate as a receiver. Signal 402 shows that transducer 300 has sent pulsed wave signal 400 into composite structure 304. Graph 316 reflects that none of the receivers have detected pulsed wave signal 400 at its current state of propagation.

Figure 5:
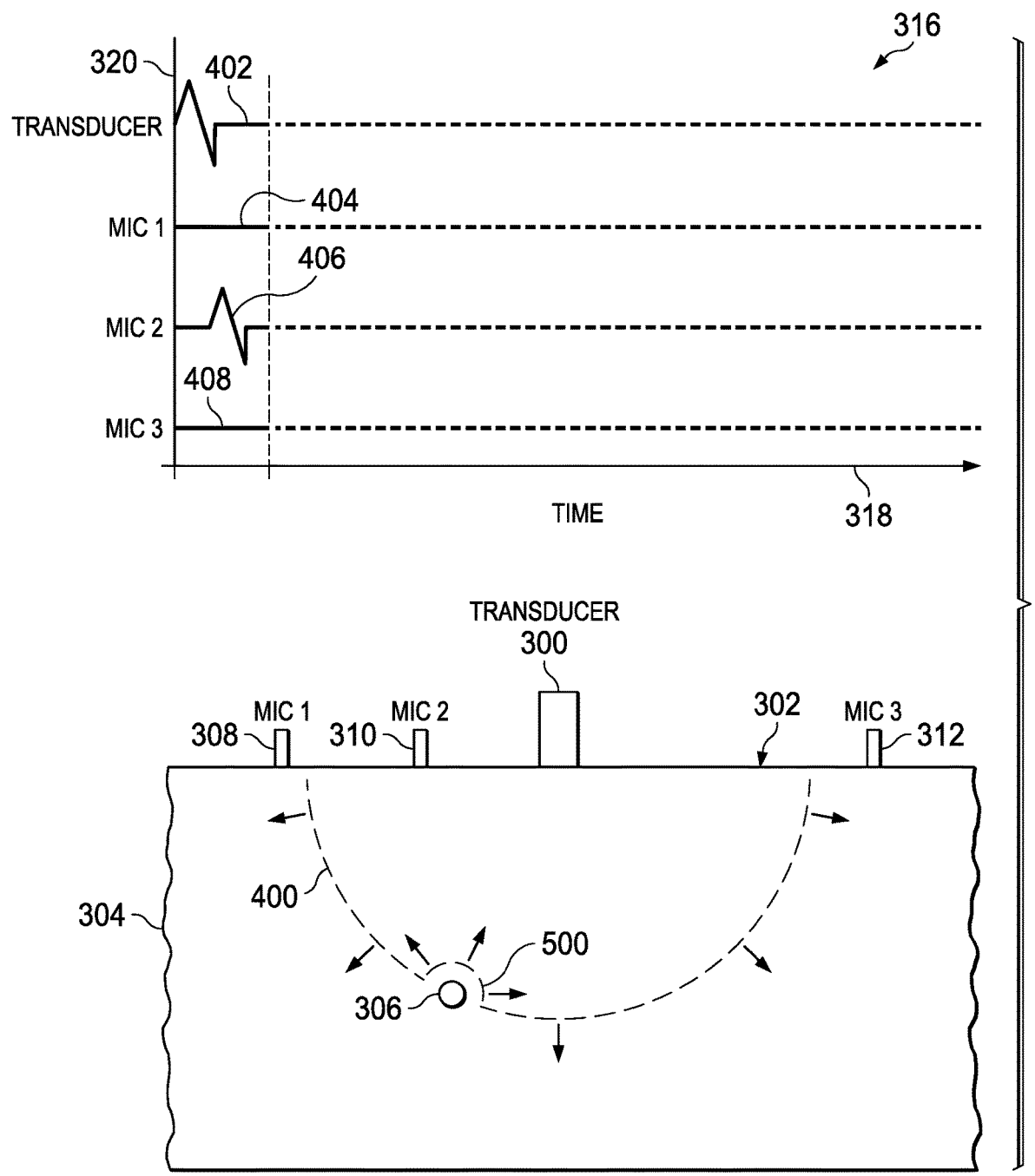
FIG. 5 is an illustration of a pulsed wave signal and a response signal in accordance with an illustrative embodiment.

Turning next to FIG. 5, an illustration of a pulsed wave signal and a response signal is depicted in accordance with an illustrative embodiment. In this figure, pulsed wave signal 400 is shown as propagating into composite structure 304. In this figure, signal 406 in graph 316 illustrates that receiver 310 has detected pulsed wave signal 400. Also, shown but not yet detected, is response signal 500 generated by pulsed wave signal 400 encountering reflector 306. Response signal 500 may be a reflection of pulsed wave signal 400 at reflector 306.

Figure 6:
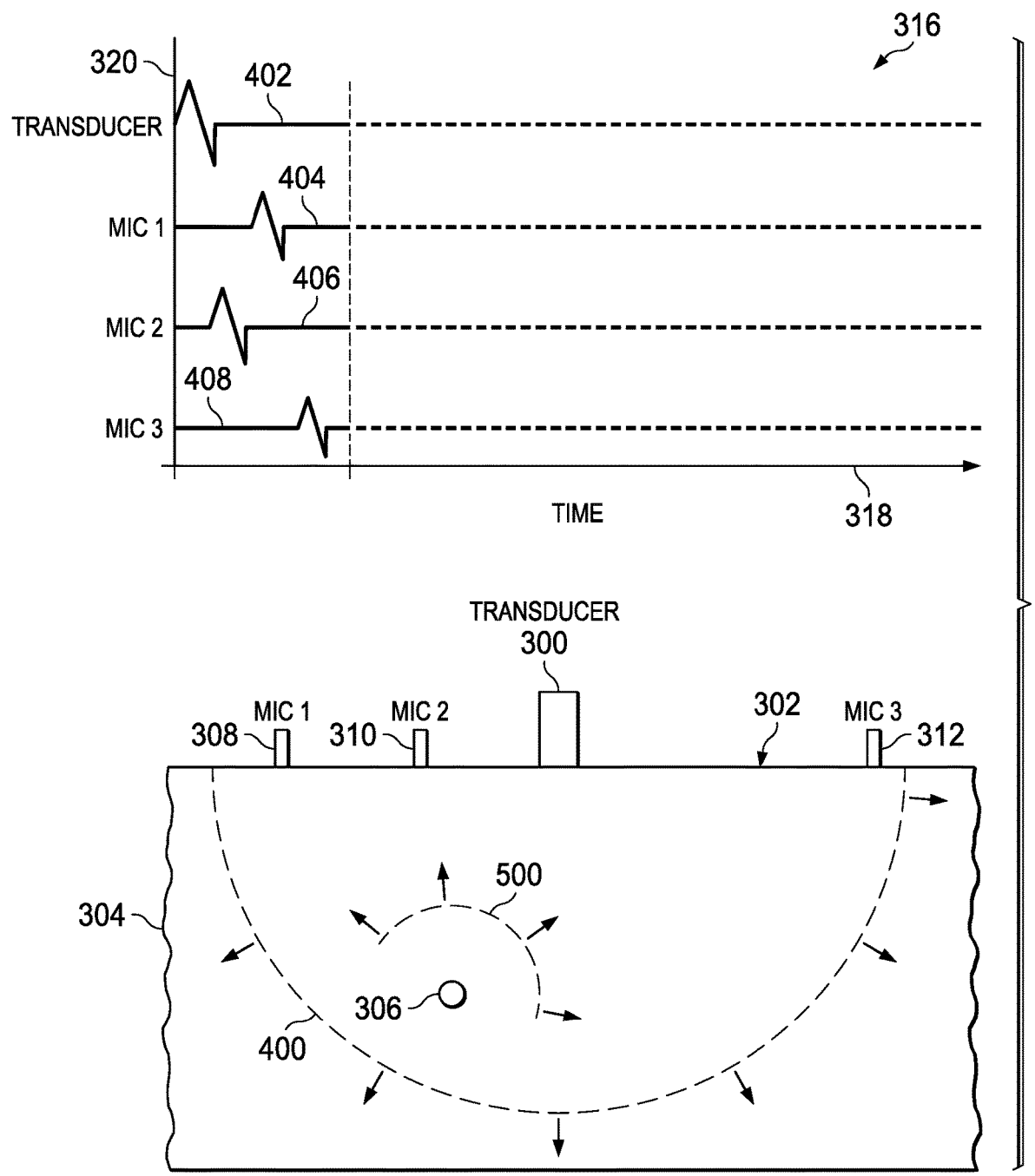
FIG. 6 is an illustration of the propagation of a pulsed wave signal and a response signal in accordance with an illustrative embodiment.

With reference now to FIG. 6, an illustration of the propagation of a pulsed wave signal and a response signal is depicted in accordance with an illustrative embodiment. In this figure, pulsed wave signal 400 has been detected by receiver 308 and receiver 310 and receiver 312. This detection of pulsed wave signal 400 is shown in signal 404 and signal 406 and signal 408 on graph 316. Response signal 500 has not yet been detected by any of the receivers in this figure.

Figure 7:
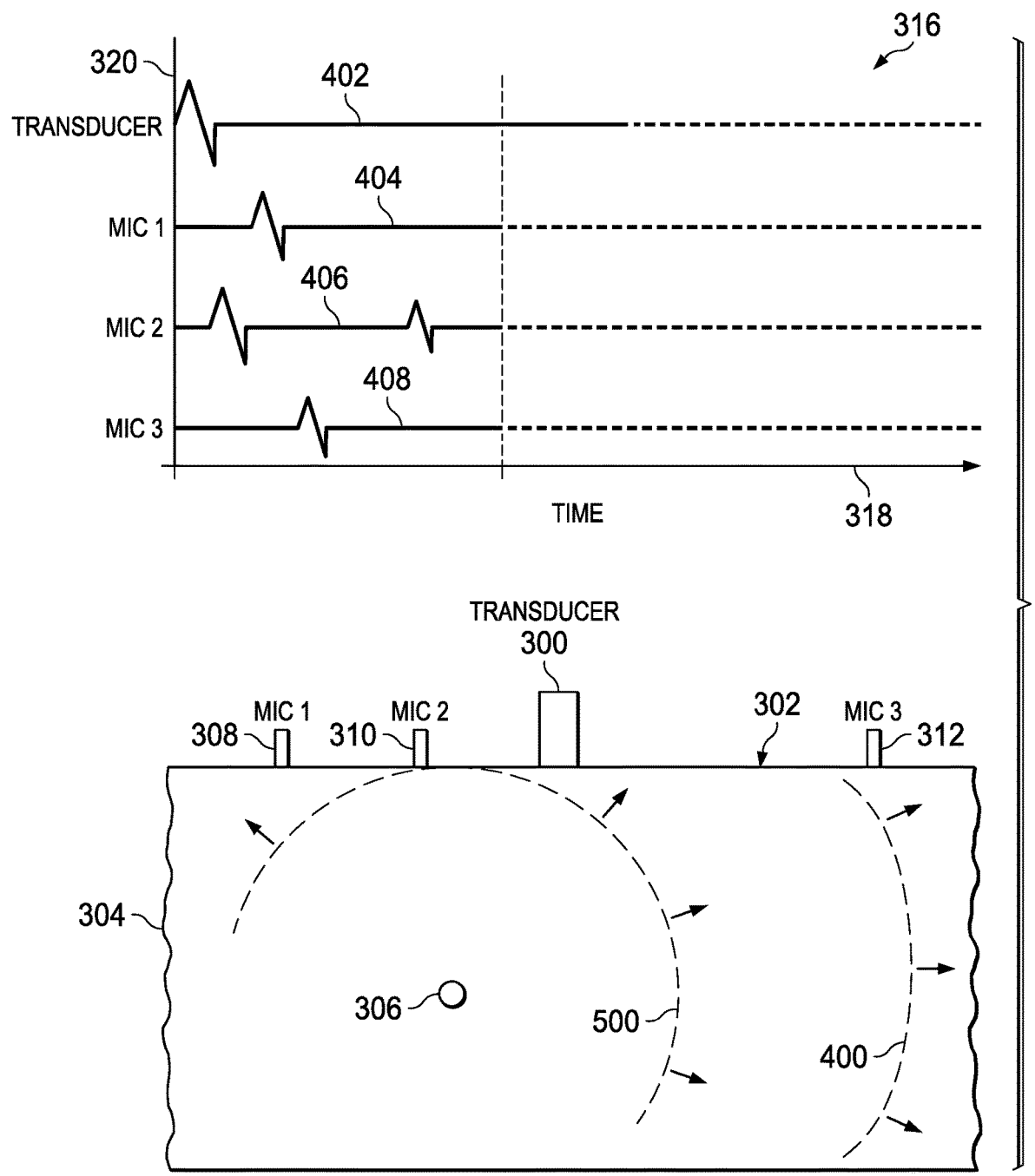
FIG. 7 is an illustration of the propagation of a pulsed wave signal and the detection of a response signal in accordance with an illustrative embodiment.

With reference to FIG. 7, an illustration of the propagation of a pulsed wave signal and the detection of a response signal is depicted in accordance with an illustrative embodiment. In this illustrative example, response signal 500 has reached receiver 310. The detection of response signal 500 by receiver 310 is shown in signal 406 on graph 316.

Figure 8:
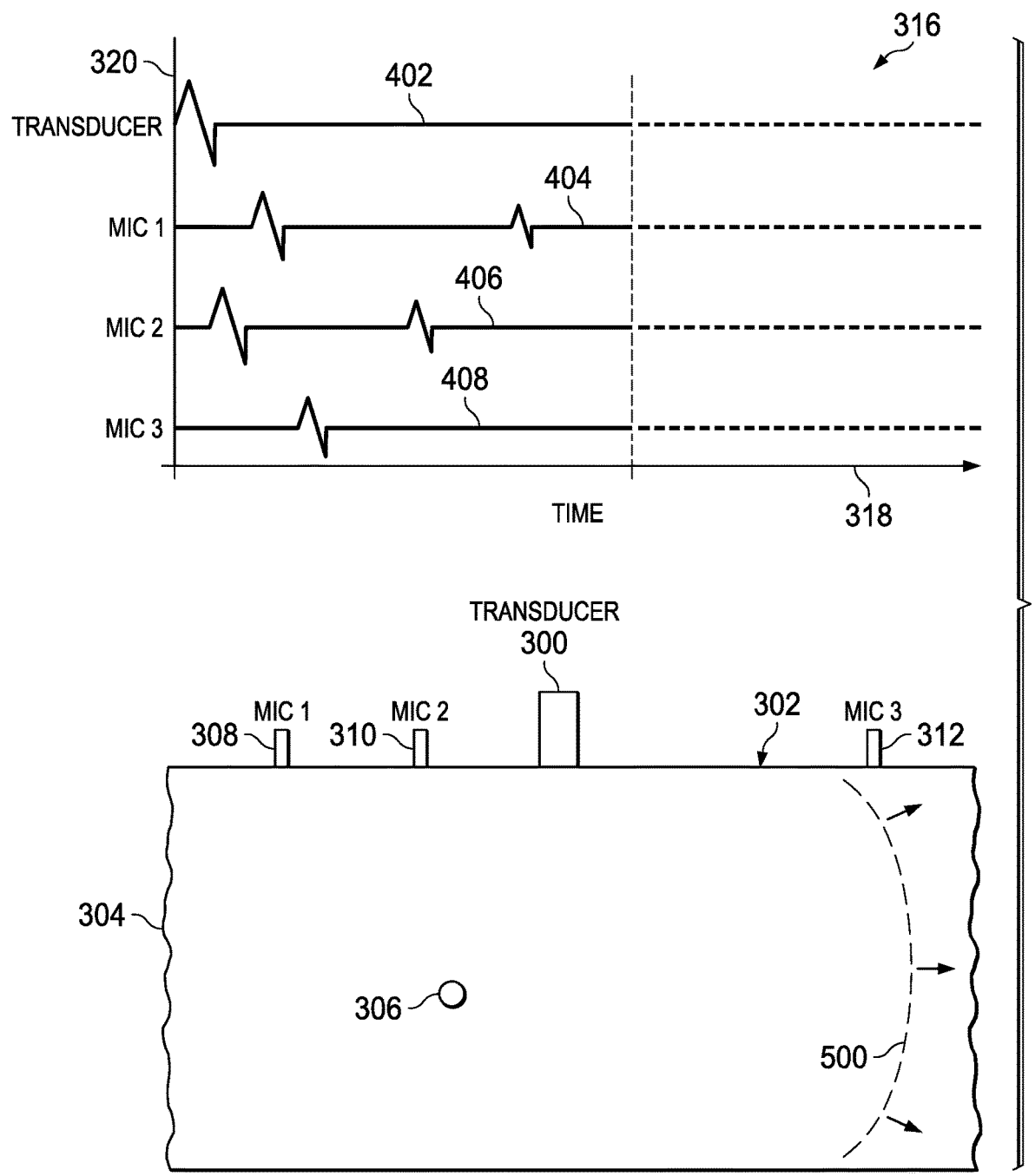
FIG. 8 is an illustration of the propagation of a pulsed wave signal and the detection of a response signal in accordance with an illustrative embodiment.

In FIG. 8, an illustration of the propagation of a pulsed wave signal and the detection of a response signal is depicted in accordance with an illustrative embodiment. In this figure, response signal 500 has been propagated such that receiver 308 may detect response signal 500. This detection is shown in signal 404 on graph 316.

Figure 9:
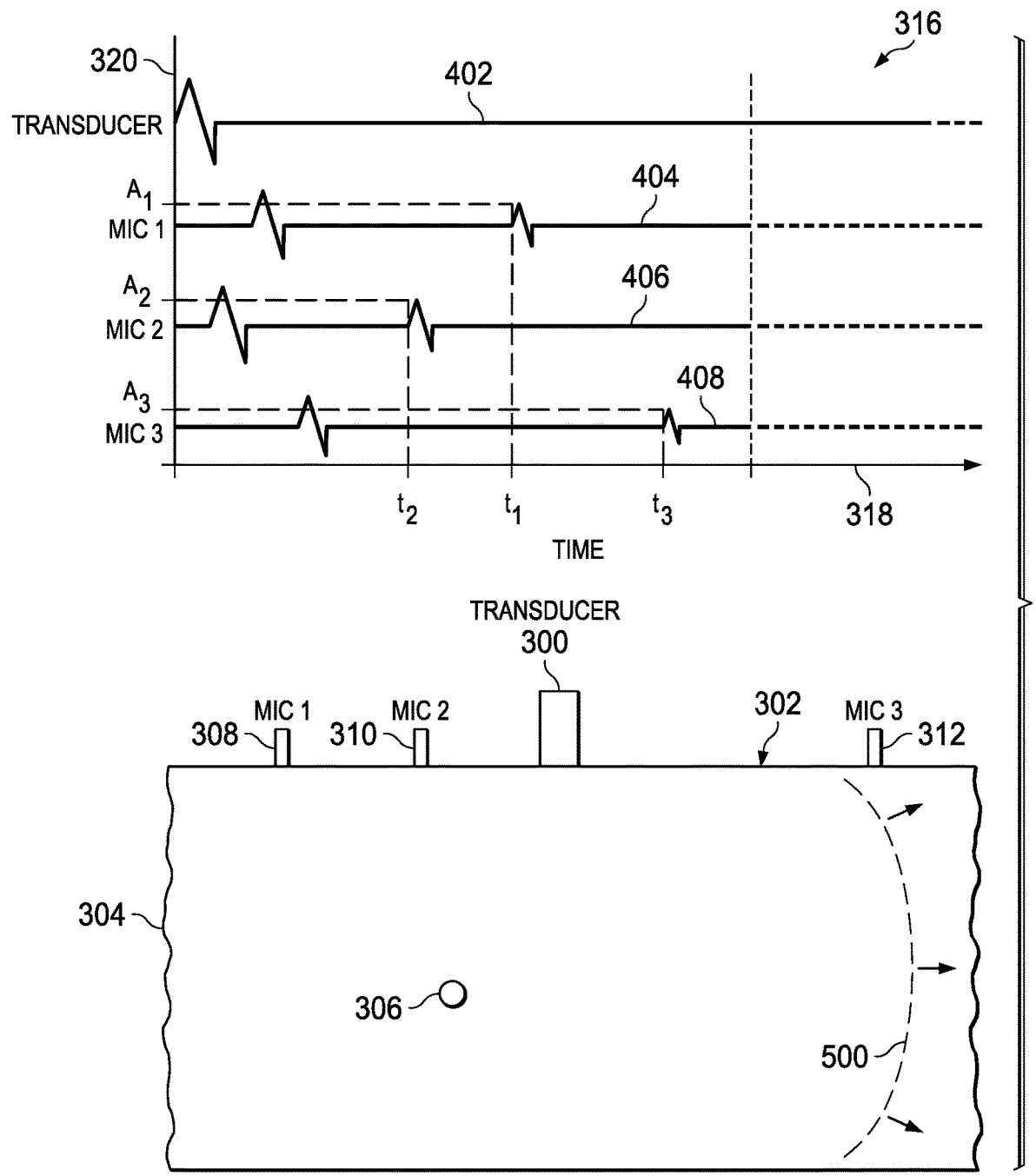
FIG. 9 is an illustration of the propagation of a pulsed wave signal and the detection of a response signal in accordance with an illustrative embodiment.

With reference to FIG. 9, an illustration of the propagation of a pulsed wave signal and the detection of a response signal is depicted in accordance with an illustrative embodiment. As depicted, response signal 500 may be detected by receiver 312. The detection of response signal 500 is shown in signal 408 on graph 316.

In this illustrative example, graph 316 shows that receiver 308 detects response signal 500 at time t1 with intensity A1 in signal 404. Receiver 310 detects response signal 500, shown in graph 316, at time t2 with intensity A2. Receiver 312 detects response signal 500 in this figure. This detection is shown in graph 316 at time t3 in signal 408. Further, signal 408 has intensity A3 at time t3.

Data points shown in graph 316 may provide time that may be used to determine time delays. This data, along with the intensities, may be used to determine the position of reflector 306.

Figure 10:
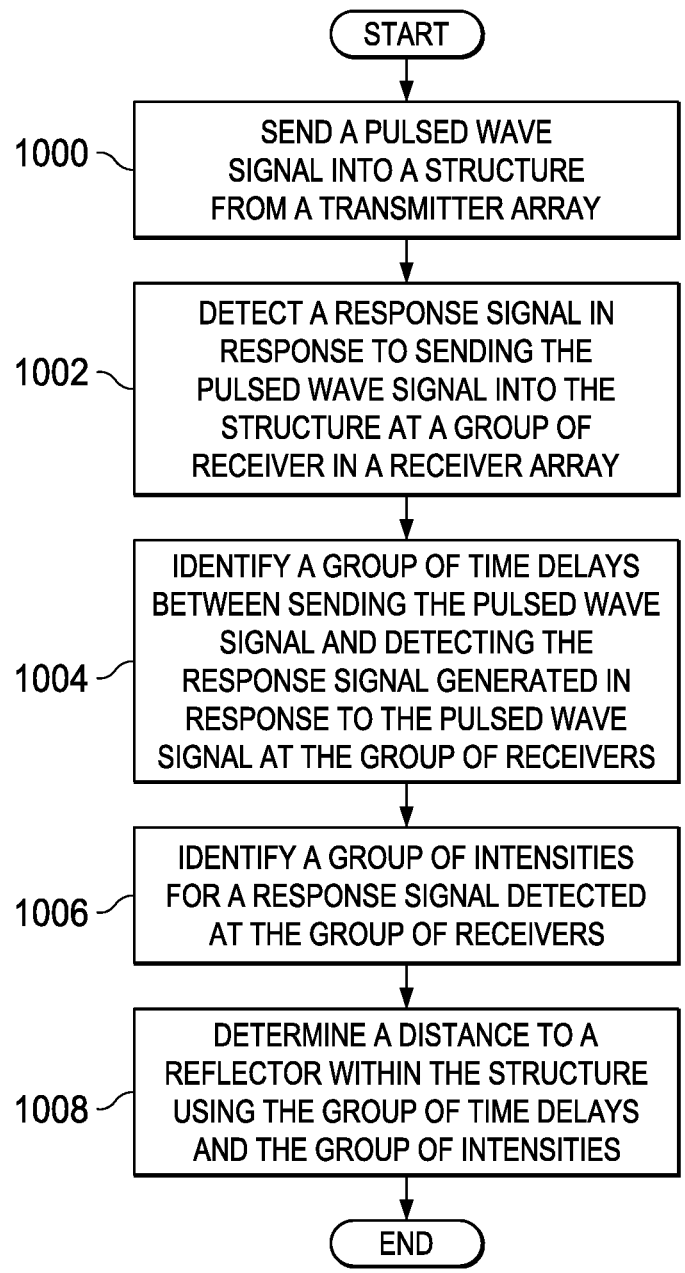
FIG. 10 is an illustration of a flowchart of a process for inspecting a structure in accordance with an illustrative embodiment.

Turning next to FIG. 10, a flowchart of a process for inspecting a structure is depicted in accordance with an illustrative embodiment. The process illustrated in FIG. 10 may be implemented in ultrasound inspection system 102 in FIG. 1. For example, the process may be implemented in inspection controller 110 in ultrasound inspection system 102 in FIG. 1. The different operations may be implemented using at least one of program code and hardware. When program code is present, the program code may be run on a processor unit in a computer system to perform the different operations.

The process may begin by sending pulsed wave signal 130 into structure 104 from transmitter array 106 (operation 1000). The process may detect response signal 132 in response to sending pulsed wave signal 130 into structure 104 at a group of receivers 124 in receiver array 108 (operation 1002).

The process may identify a group of time delays 134 between sending pulsed wave signal 130 and detecting response signal 132 generated in response to pulsed wave signal 130 at the group of receivers 124 (operation 1004). The process may identify a group of intensities 136 for response signal 132 detected at the group of receivers 124 (operation 1006). The process may determine distance 138 to reflector 140 within structure 104 using the group of time delays 134 and the group of intensities 136 (operation 1008). The process may terminate thereafter.

Figure 11:
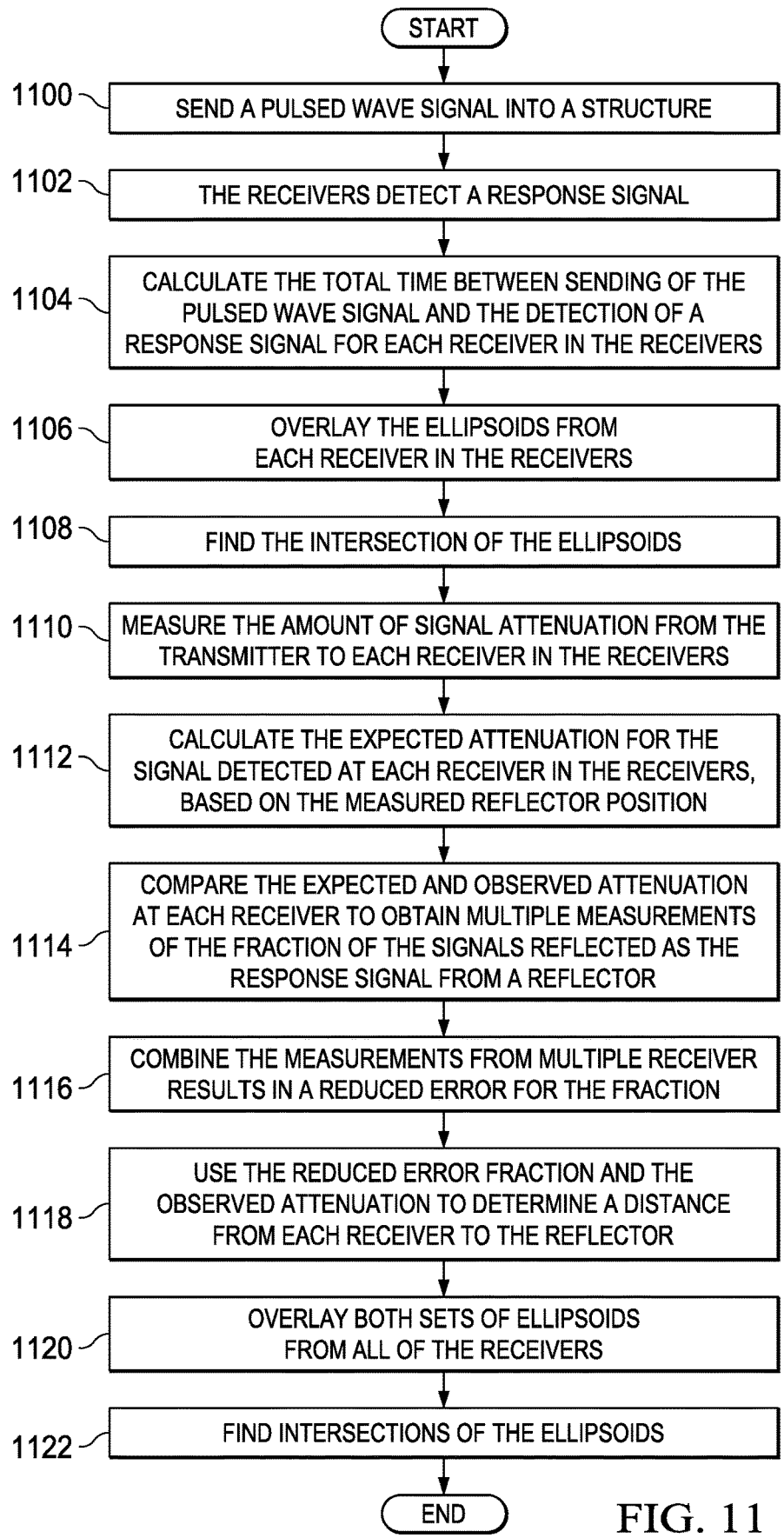
FIG. 11 is an illustration of a flowchart of a process for identifying the location of a reflector in accordance with an illustrative embodiment.

With reference now to FIG. 11, a flowchart of a process for identifying the location of a reflector is depicted in accordance with an illustrative embodiment. The process illustrated in FIG. 11 may be implemented in ultrasound inspection system 102 in FIG. 1. For example, the process may be implemented in inspection controller 110 in ultrasound inspection system 102 in FIG. 1. The different operations may be implemented using at least one of program code and hardware. When program code is present, the program code may be run on a processor unit in a computer system to perform the different operations. This process may be used to solve for the location of a single reflector.

The process may begin by sending pulsed wave signal 130 into structure 104 (operation 1100). Receivers 124 may detect response signal 132 (operation 1102). Response signal 132 may be a reflection of pulsed wave signal 130 of reflector 140.

For each receiver in receivers 124, the total time between sending of pulsed wave signal 130 and the detection of response signal 132 may be calculated (operation 1104). The total time forms time delays 134. In this illustrative example, the speed of sound may be used to calculate the total distance traveled by the signal. That total distance may be the sum of the distance of both legs of travel.

The first leg is the time of travel of pulsed wave signal 130 from a transmitter in transmitters 116 to reflector 140 and the second leg may be the time of travel of response signal 132 from reflector 140 to a receiver in receivers 124. The sum prescribes an ellipsoid as a volume in volumes 142 when the calculation is performed in three dimensions. An ellipse is present if the calculations are in two dimensions.

The process may overlay the ellipsoids from each receiver in receivers 124 (operation 1106). The process may then find the intersection of the ellipsoids (operation 1108). The intersection may be the location of reflector 140.

The process may measure the amount of signal attenuation from the transmitter to each receiver in receivers 124 (operation 1110). The signal attenuation may be the product of the fraction of the signal reflected that forms response signal 132 from the reflector 140, the attenuation per distance, and the distance to the reflector 140.

Based on the measured reflector position, the process may calculate the expected attenuation for the signal detected at each receiver in receivers 124 (operation 1112). The process may compare the expected and observed attenuation at each receiver to obtain multiple measurements of the fraction of the signals reflected as response signal 132 from reflector 140 (operation 1114). The process may combine the measurements from multiple receiver results in a reduced error for the fraction (operation 1116). In operation 1116, the combining of measurements may be performed by averaging N measurements with error ε results in one average measurement value with error ε/Sqrt(N).

The process may use the reduced error fraction and the observed attenuation to determine a distance from each receiver to reflector 140 (operation 1118). This result prescribes a second ellipsoid for each receiver.

The process may overlay both sets of ellipsoids from all of receivers 124 (operation 1120). The process may then find intersections 146 of those ellipsoids (operation 1122). The process may terminate thereafter. This result may provide a refined location of reflector 140.

In the illustrative example in FIG. 11, reflector 140 may be a point whose position may be known to be within a certain volume of space that is described at a position with some uncertainty (x+−ex, y+−ey, z+−ez). The vector to the receiver would thus be from the reflector defect point position to the known receiver position. This vector will have different x, y, and z components, but similar errors in each. The distance may be calculated with errors as "d±ed". Then the intensity may be determined from this distance based on the attenuation per unit distance, resulting in I±eI, wherein "I" is intensity.

The measured intensity is aI, where "a" is the fraction of the pressure wave that reflects off of reflector 140. At any boundary, a portion of the pressure wave will reflect and another portion of the pressure wave will propagate through the boundary. Variable "a" is a property of reflector 140 itself. As a result, the "a" observed by one receiver should be the same "a" observed by another receiver. Based on the position of the defect, receiver 1 may be expected to see intensity (I1+−eI1) and it sees "Ireal1". The ratio is "a", or a1+−ea1. The same math applied for receiver 2 determines a possible value for "a" from the expected and observed intensity at microphone 2. The same may be expected any the other receivers.

These multiple measurements for the same variable may be combined to produce a measurement of the variable with a lower error. Then the process may be reversed. "Ireal1/a" as combined may give a measure of the distance from receiver 1 to reflector 140, that will have a smaller error bar than the previously-calculated "d+−ed".

Thus, a tighter ellipsoid may be obtained for each receiver than from just using just the time delays. Also, the intersection of these tighter ellipsoids may provide a point reflector position with smaller errors than possible from using the time delays alone.

When multiple reflectors are present, multiple reflections and multiple returns may be detected by each receiver. If two defects are equidistant (leg 1+leg 2) from a particular microphone, such that the two returns overlap, other receivers will see the reflections as individual events. This event may be identified in operations 1112-1116 above, wherein the fraction of signal reflected from a given defect is determined. In such a case, the results of that receiver can be excluded from the second calculation, or the two contributions can be separated out within the signal received at that receiver. The latter technique may require a swept frequency pulse to be used in pulsed wave signals 118

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

Figure 12:
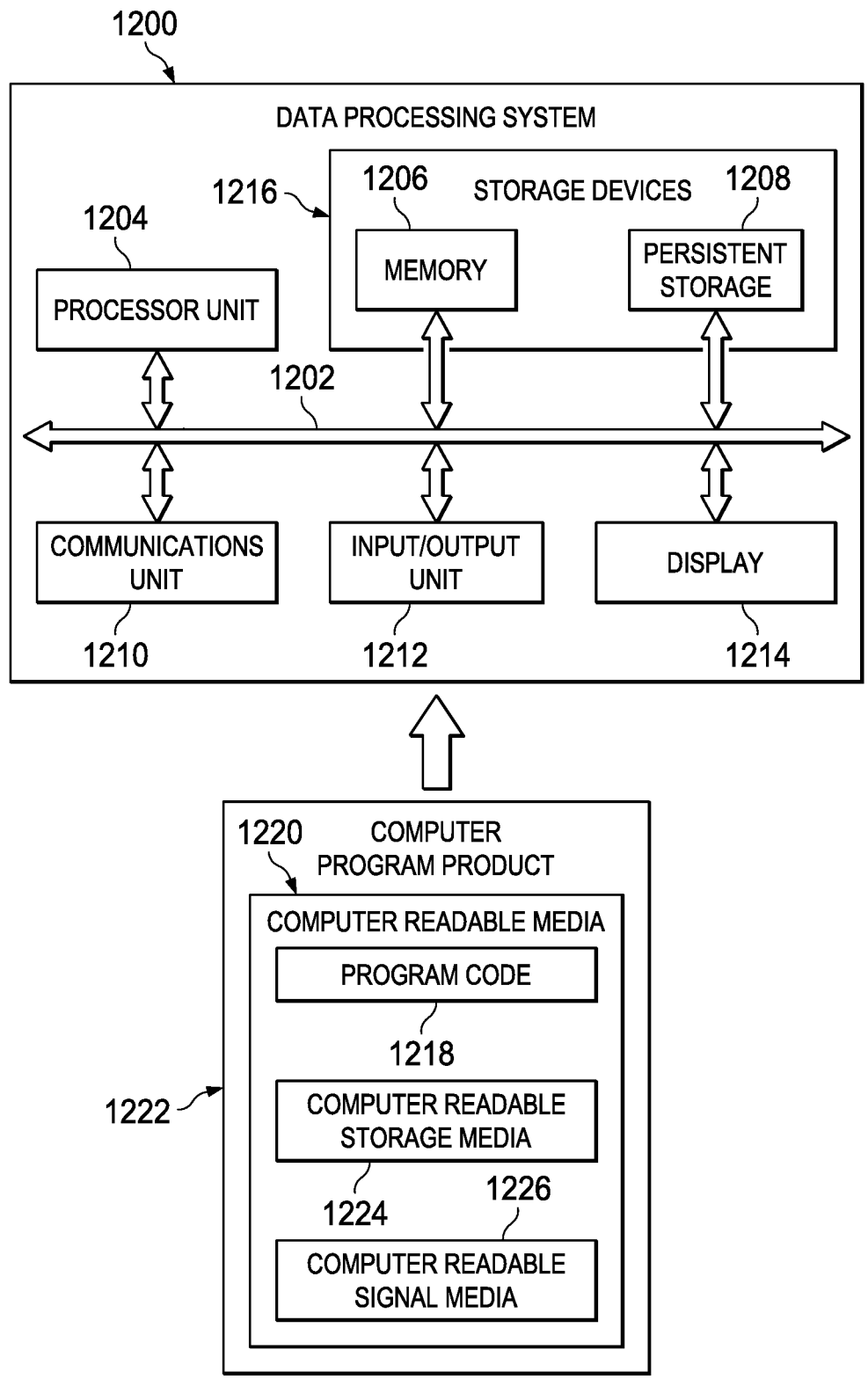
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement computer system 128 in FIG. 1. In this illustrative example, data processing system 1200 includes communications framework 1202, which provides communications between processor unit 1204, memory 1206, persistent storage 1208, communications unit 1210, input/output unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid state hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer-usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In one example, computer-readable media 1220 may be computer-readable storage media 1224 or computer-readable signal media 1226.

In these illustrative examples, computer-readable storage media 1224 is a physical or tangible storage device used to store program code 1218 rather than a medium that propagates or transmits program code 1218.

Alternatively, program code 1218 may be transferred to data processing system 1200 using computer-readable signal media 1226. Computer-readable signal media 1226 may be, for example, a propagated data signal containing program code 1218. For example, computer-readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable types of communications links.

The different components illustrated for data processing system 1200 are not meant to provide architectural limitations to the manner in which different embodiments may be implemented. The different illustrative embodiments may be implemented in a data processing system including components, in addition to or in place of those illustrated, for data processing system 1200. Other components shown in FIG. 12 can be varied from the illustrative examples shown. The different embodiments may be implemented using any hardware device or system capable of running program code 1218.

Figure 13:
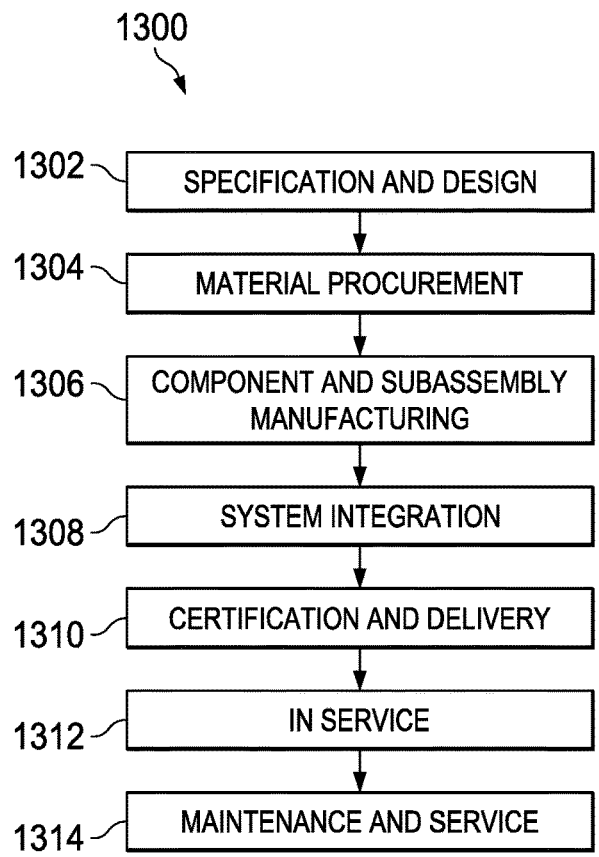
FIG. 13 is an illustration of a block diagram of an aircraft manufacturing and service method in accordance with an illustrative embodiment.
Figure 14:
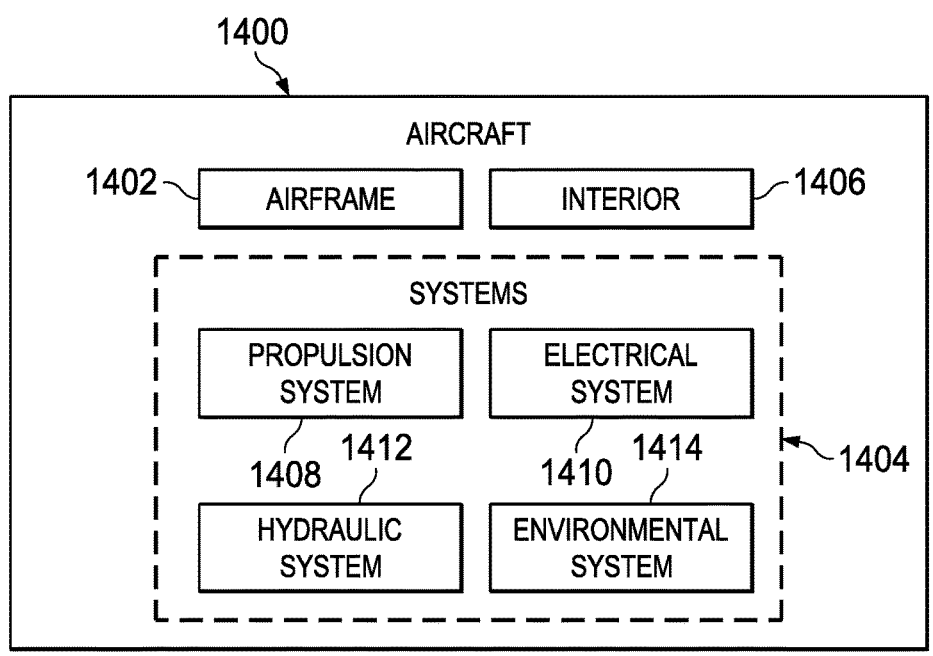
FIG. 14 is an illustration of a block diagram of an aircraft in which an illustrative embodiment may be implemented.

Illustrative embodiments of the present disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, or other maintenance and service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. For example, ultrasound inspection system 102 with inspection controller 110 in FIG. 1 may be used to perform inspections of parts, assemblies, and other structures produced during component and subassembly manufacturing 1306 and system integration 1308 in FIG. 13. As another example, ultrasound inspection system 102 may be employed during in service 1312 or maintenance and service 1314 to inspect structures in aircraft 1400. The structures may include those in airframe 1402 and interior 1406 of aircraft 1400. Further, ultrasound inspection system 102 may be used during maintenance and service 1314 to inspect structures produced for use in routine maintenance, upgrades, refurbishment, modification, or reconfiguration of aircraft 1400.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400. For example, the use of ultrasound inspection system 102 may be used to reduce the amount of reworking or replacement of structures for aircraft 1400.

Thus, one or more technical solutions may be present that overcome a technical problem with at least one of detecting and locating the positions of reflectors in structures using ultrasound systems. As a result, one or more technical solutions may provide a technical effect in which inspection controller 110 uses the group of time delays 134 and the group of intensities 136 increases a signal-to-noise ratio (SNR) for response signal 132 in FIG. 1. With the increase in the signal-to-noise ratio, increased efficiency and detecting and locating reflectors 114 may occur while using ultrasound inspection system 102.

For example, ultrasound inspection system 102 may implement a method for pulse echo ultrasound inspection using inspection controller 110. As described above, inspection controller 110 may interrogate structure 104 by sending pulsed wave signals 118 into structure 104 from transmitter array 106 and receive response signals 122 reflected back from reflector 140 at receiver array 108. Inspection controller 110 may analyze the time from transmission to reception to identify time delays 134. Further, inspection controller 110 may analyze intensities 136 and response signal 132 as received at different ones of receivers 124 in receiver array 108. With this information, inspection controller 110 may determine the distance to reflector 140 in structure 104 using time delays 134 and intensities 136.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for inspecting a structure, the method comprising:
   sending a pulsed wave signal into the structure from a transmitter array;
   detecting a response signal in response to sending the pulsed wave signal into the structure at a group of receivers in a receiver array;
   identifying a group of time delays between sending the pulsed wave signal and detecting the response signal generated in response to the pulsed wave signal at the group of receivers;
   determining a group of volumes in a space containing a group of reflectors using the group of time delays and a group of positions of the group of receivers;
   determining a preliminary group of intersections of the group of volumes;
   identifying a group of intensities for the response signal detected at the group of receivers;
   determining a distance to a reflector of the group of reflectors within the structure using the preliminary group of intersections and the group of intensities;
   determining a group of expected intensities comprised of an expected intensity at each receiver of the group of receivers for the response signal based on the distance to the reflector and the response signal at one receiver in the group of receivers;
   comparing the group of expected intensities for the response signal to the group of intensities for the response signal detected at the group of receivers;
   determining a second group of volumes in the space containing the group of reflectors using the comparison of the group of expected intensities for the response signal to the group of intensities for the response signal detected at the group of receivers;
   determining a secondary group of intersections of the group of volumes and the second group of volumes; and
   determining a refined distance to the reflector of the group of reflectors within the structure using the secondary group of intersections.

2. The method of claim 1 further comprising:
   creating a map of the structure including a position of the reflector in the structure using the group of time delays and the group of intensities.

3. The method of claim 1 wherein the preliminary group of intersections indicate a group of potential positions for the reflector.

4. The method of claim 1 wherein the transmitter array and the receiver array are positioned on a surface of the structure.

5. The method of claim 1, wherein using the group of time delays and the group of intensities increases a signal to noise ratio for the response signal.

6. The method of claim 1, wherein the structure is a composite structure, the method further comprising:
   differentiating between ply boundaries and porosity in the composite structure using the group of intensities in the response signal.

7. The method of claim 1, wherein the transmitter array and the receiver array are located in a transducer array.

8. The method of claim 1, wherein the structure is comprised of at least one of a composite material, a metal, an alloy, an organic material, or a plastic.

9. The method of claim 1, wherein the structure is comprised of at least one of a composite structure, an organic structure, an aircraft, a dam, a bridge, a skin panel, a building, a rib, a spar, a stringer, an engine housing, a fuselage section, a monument, a container, a wall, a pipe, a control surface, a fuel tank, a body, an arm, a leg, or a torso.

10. An ultrasound inspection system comprising:
    a transmitter array configured to transmit pulsed wave signals;
    a receiver array configured to detect response signals; and
    an inspection controller configured to cause the transmitter array to send a pulsed wave signal into a structure from the transmitter array, and detect a response signal in response to sending the pulsed wave signal into the structure at a group of receivers in the receiver array;
    wherein the inspection controller is configured to:
        determine a group of volumes in a space containing a group of reflectors using the response signal;

determine a distance to a reflector of the group of reflectors using the group of volumes and a group of intensities for the response signal detected at the group of receivers;

calculate a group of expected intensities comprised of an expected intensity at each receiver of the group of receivers for the response signal based on the distance to the reflector and the response signal at one receiver of the group of receivers;

compare a detected intensity of the group of intensities for the response signal at each receiver of the group of receivers to a calculated expected intensity of the group of expected intensities at each receiver of the group of receivers to determine a second group of volumes in the space containing the group of reflectors; and determine a refined distance to the reflector of the group of reflectors within the structure based on a group of intersections of the group of volumes and the second group of volumes.

11. The ultrasound inspection system of claim 10, wherein the inspection controller is configured to identify a group of time delays from sending the pulsed wave signal and detecting the response signal generated in response to the pulsed wave signal at the group of receivers and identify the group of intensities for the response signal detected at the group of receivers.

12. The ultrasound inspection system of claim 11, wherein the inspection controller determines the group of volumes in the space containing the group of reflectors using the group of time delays and a group of positions of the group of receivers.

13. The ultrasound inspection system of claim 12, wherein the inspection controller determines a primary group of intersections of the group of volumes.

14. The ultrasound inspection system of claim 13, wherein the inspection controller determines the calculated expected intensity of the response signal at each receiver of the group of receivers based on a distance to each reflector in the group of reflectors and the response signal at one receiver in the group of receivers.

15. The ultrasound inspection system of claim 11, wherein using the group of time delays and the group of intensities increases a signal to noise ratio for the response signal.

16. The ultrasound inspection system of claim 11, wherein the structure is a composite structure, and wherein the inspection controller differentiates between ply boundaries and porosity in the composite structure using the group of intensities in the response signal.

17. The ultrasound inspection system of claim 11, wherein the inspection controller creates a map of the structure including a position of the reflector in the structure using the group of time delays and the group of intensities.

18. The ultrasound inspection system of claim 10, wherein the transmitter array and the receiver array are located in a transducer array.

19. The ultrasound inspection system of claim 10, wherein the structure is comprised of at least one of a composite material, a metal, an alloy, an organic material, or a plastic.

20. The ultrasound inspection system of claim 10, wherein the structure is comprised of at least one of a composite structure, an organic structure, an aircraft, a dam, a bridge, a skin panel, a building, a road, a rib, a spar, a stringer, an engine housing, a fuselage section, a monument, a container, a wall, a pipe, a control surface, a fuel tank, a body, an arm, a leg, or a torso.

* * * * *